United States Patent [19]

Cohen et al.

[11] Patent Number: 5,737,524
[45] Date of Patent: Apr. 7, 1998

[54] ADD-IN BOARD WITH PROGRAMMABLE CONFIGURATION REGISTERS FOR USE IN PCI BUS COMPUTERS

[75] Inventors: Ariel Cohen, Zichron-Yaacov, Israel; William Gavin Holland, Cary; Joseph Franklin Logan, Raleigh, both of N.C.; Avi Parash, Ramat-Yishay, Israel

[73] Assignee: International Business Machines Corporation, Armonk, N.Y.

[21] Appl. No.: 446,390

[22] Filed: May 22, 1995

[51] Int. Cl.⁶ .................................................. G06F 13/00
[52] U.S. Cl. ...................... 395/200.01; 395/281; 395/309
[58] Field of Search .................................. 395/200, 800, 395/500, 293, 281, 280, 309, 856, 828, 883, 416; 364/200

[56] References Cited

U.S. PATENT DOCUMENTS

| | | | |
|---|---|---|---|
| 4,403,303 | 9/1983 | Howes et al. | 364/900 |
| 4,533,992 | 8/1985 | Magar et al. | 364/200 |
| 5,067,071 | 11/1991 | Schanin et al. | 395/275 |
| 5,343,478 | 8/1994 | James et al. | 371/22.3 |
| 5,446,869 | 8/1995 | Padett et al. | 395/500 |
| 5,491,827 | 2/1996 | Holtey | 395/800 |
| 5,528,764 | 6/1996 | Heil | 395/293 |
| 5,535,419 | 7/1996 | O'Brien | 395/856 |
| 5,608,876 | 3/1997 | Cohen et al. | 395/281 |

FOREIGN PATENT DOCUMENTS 8605293  9/1986  WIPO ............................ G06F 13/12

OTHER PUBLICATIONS

Wescon Technical Papers, 27–29 September 1994, New York, US pp. 568–573, XP000532626.
Geber & Yee: "Peripheral Component Interconnect (PCI) Interface with Quicklogic QL16X24B FPGA".

Primary Examiner—Jack B. Harvey
Assistant Examiner—Eric S. Thlang
Attorney, Agent, or Firm—Joscelyn G. Cockburn

[57] ABSTRACT

An adapter or add-in card for using in a peripheral component interconnect (PCI) computer includes a universal module which couples the card to the PCI bus. The module includes a set of selectively programmable configuration registers which are loaded by a microprocessor on the adapter. A circuit arrangement on the module issues a command which inhibits the PCI processor from accessing the configuration registers until fully loaded.

21 Claims, 7 Drawing Sheets

ADD-IN BOARD WITH PROGRAMMABLE CONFIGURATION REGISTERS FOR USE IN PCI BUS COMPUTERS

BACKGROUND OF THE INVENTION

Cross Reference to Related Patent Application

The present U.S. patent application Ser. No. 08/446,390 relates to U.S. patent application Ser. No. 08/447,022. Both applications are filed on the same date and assigned to a common assignee. Whereas the present invention relates to a PCI interface module with programmable configuration registers, the invention disclosed in Ser. No. 08/447,022 relates to the PCI interface module with means to activate/deactivate the PCI ROM.

1) Field of the Invention

The present invention relates to computer systems in general and in particular to devices, called adapter cards or add-in boards, for coupling a plurality of computer systems or for coupling devices to a computer system.

2) Background of the Invention

The use of a communications interface or input/output bus for coupling separate devices, such as processors, memories and peripherals, of a computer system is well known in the prior art.

Computer systems are not only used to perform several stand alone tasks but also to exchange information between one another. In order to exchange information, the computer systems are connected into a computer network. The conventional computer network includes a communications medium and a plurality of computer systems connected to the communications medium. Usually, an add-in board couples the bus of the computer system to the communications medium. To make their computers more attractive to users, most manufacturers have tried to standardize the design of their computer buses. Standardized buses such as ISA, EISA, Micro Channel™, etc., are well known in the prior art.

The Peripheral Component Interconnect (PCI) bus is another one of the standardized buses. It is a high performance 32 or 64 bit bus with multiplexed address, control and data lines. The PCI bus is intended for use as an interconnect mechanism between highly integrated peripheral components, peripheral add-in boards and processor/memory subsystems. The specification for the PCI bus is set forth in the document PCI Local Bus Specification, Production Version Revision 2.0, Apr. 30, 1993.

The manual is prepared and maintained by the PCI Special Interest Group (SIG). The PCI-SIG is an organization which is open for membership to all companies in the computer industry. It is believed that the PCI bus will emerge as the predominant expansion bus for add-in boards in high performance personal computers (PCs), workstations and servers.

To be compatible with the PCI bus specification, all add-in boards are required to provide configuration registers. Some of the registers are "read only" which are used by the PCI processor to identify the device and its capabilities. The other registers are read/write which are read and written by the PCI processor. The read/write registers provide information to configure device resources such as I/O addresses, memory addresses, interrupt levels, cache line size, etc.

In a typical implementation, specific values are permanently set or coded in the read only configuration registers. The values are embedded in the VLSI chip component used in the add-in board to interface with the PCI bus. The values are hard coded and cannot be changed. Consequently, the chip can only be used to indicate one function or application to the PCI computer.

In some cases, it may be desirable to use the same chip in a variety of different applications. For example, one may want to use the same chip on an ethernet add-in board or a Small Computer System Interface (SCSI) add-in board. In order to do so, different values would have to be loaded in the configuration register so that the chip reports, to the PCI computer, different device ID and class code information for each application. Another example requiring different values in the configuration registers is when a manufacturer sells the chip to different vendors. Conceivably, each vendor would want to use a different vendor identification value and the module would have to be capable of reporting the different vendors ID values to the PCI processor.

The obvious solution to address the above situations is to provide a new version of the chip each time the chip is used in a new application or by different vendors. However, for obvious reasons, such as cost, manufacturing delays, etc., this obvious solution would be unacceptable. As a consequence, an acceptable and/or practical solution is required to allow a single chip or module, hereinafter called a "PCI bus interface chip" or interface module, to be used for different applications in the PCI bus computer system.

SUMMARY OF THE INVENTION

It is therefore, a main object of the present invention to provide a novel add-in board for use in a PCI computer.

It is another object of the present invention to provide a universal interface module for coupling an add-in board to the PCI bus of a PCI bus computer.

It is another object of the present invention to provide an add-in board with programmable configuration registers.

The novel add-in board includes a sub-assembly which is specifically designed to perform a predetermined application (such as attachment to a communications network, attachment to different type devices, etc.) and the universal interface module with programmable PCI configuration registers. As a consequence, the PCI configuration registers can be programmed with different values selected according to a specific use.

In particular, the add-in board of the present invention includes an add-in board microprocessor with a local bus to which a non-volatile storage and the universal interface module, hereafter called the PCI bus interface chip, are coupled. A set of registers, including read/only registers are provided in the PCI bus interface chip. Following power up, the PCI bus interface chip controller will activate selected control lines on the PCI bus to indicate a "retry mode" in response to accesses to its PCI configuration registers from the PCI system processor. While in this "retry mode" the PCI system processor is prevented from accessing the PCI bus interface chip's configuration registers, and the PCI system processor is signalled that it should "retry" the register access again at a later time. During the prohibition or no-read period, the add-in board microprocessor accesses the non-volatile storage and loads the configuration registers with the information which is stored in the non-volatile storage.

When the loading is completed, the add-in microprocessor activates a control bit, hereafter called the PCI access grant bit, in a control register on the PCI bus interface chip. The output signal from the bit causes the PCI bus interface controller to de-activate the previously activated control lines and as a consequence, the PCI processor is free to access the registers on the PCI bus interface chip.

In another feature of the invention, the function of the PCI access grant bit is over-ridden by a signal generated from an input pin, called the PCI access over-ride input pin, located on the PCI bus interface chip. If the pin is set to a first electrical state called the "inactive high state", the PCI access over-ride input pin will permit retries of PCI configuration registers to be controlled by the PCI access grant bit as described above. If the pin is set to a second state called the "low state" the PCI access over-ride input pin will over-ride the function of the PCI access grant bit and permit all accesses from the PCI bus to the configuration registers to be serviced normally without retries. In this embodiment, the power-on default values of the read-only PCI configuration registers are used and the features for loading different values in the PCI configuration registers is disabled.

The foregoing features and advantages of this invention will be more fully described in the accompanying drawings.

DETAILED DESCRIPTION OF THE PREFERRED EMBODIMENT

Figure 1:
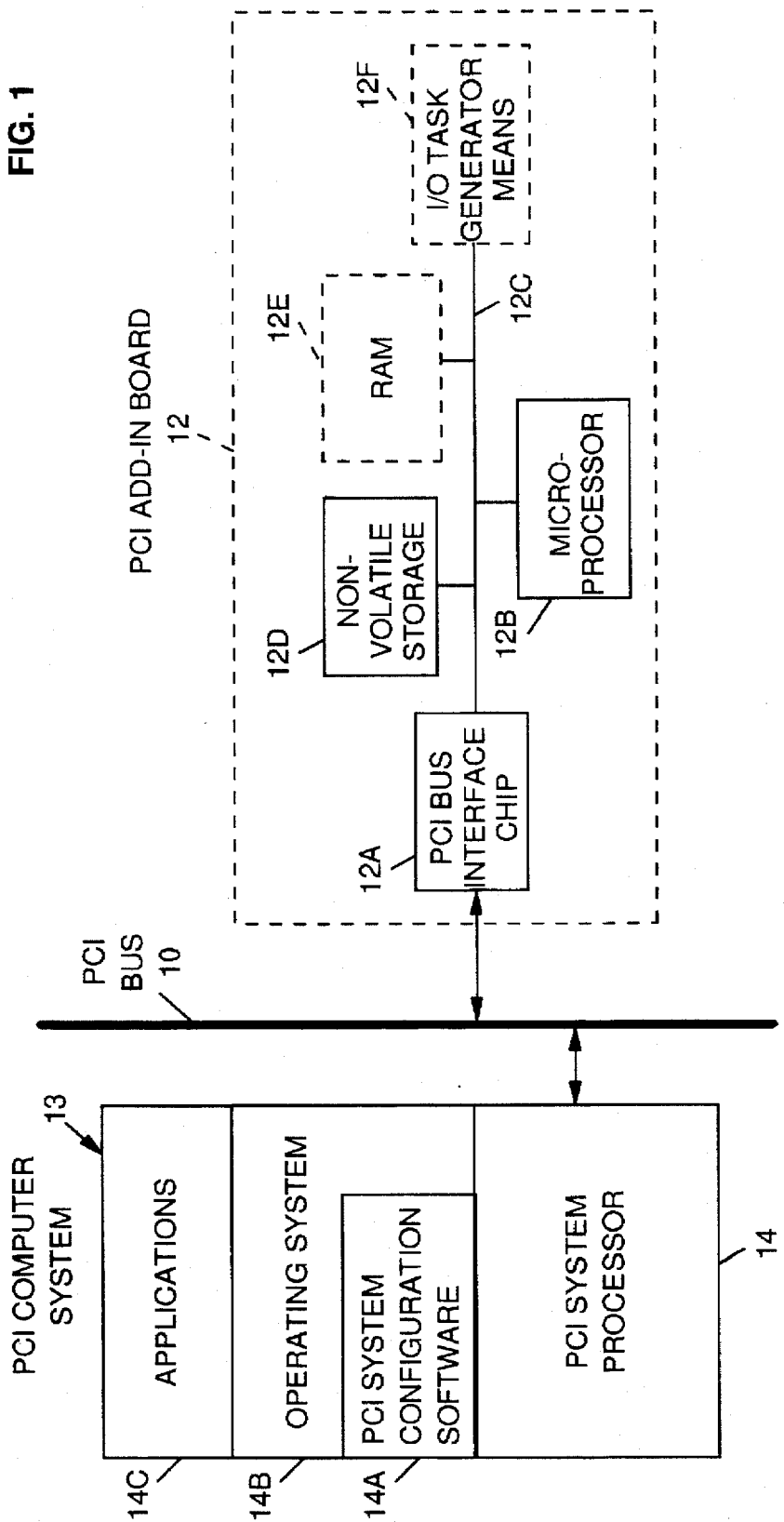
FIG. 1 shows a system level view block diagram of the PCI add-in board according to the teachings of the present invention.

FIG. 1 shows a block diagram of a PCI computer system 13. The PCI computer system is comprised of PCI bus 10, PCI add-in board 12 and PCI processor 14. The PCI processor 14 includes several software products including PCI system configuration software 14A, operating system 14B and several application programs 14C. The respective functions of the software are well-known in the art. Therefore, a detailed description of each will not be given. Suffice it to say that the PCI system configuration software 14A performs the function needed to control the configuration registers (to be described later) on the PCI add-in board 12. In general, the PC System Configuration Software 14A is part of what is typically called "BIOS" (Basic Input/Output System) software which performs the power-on diagnostic for the system and provides the various low level routines to support system configuration and data input. The PCI Special Interest Group (PCI-SIG) publishes the PCI BIOS Specification, Revision 2.0, Jul. 20, 1993 which outlines the function required in the PCI configuration software. The document is incorporated herein by reference. The PCI BIOS Specification sets forth sufficient information to enable a programmer to design a suitable software module.

As described previously, the PCI bus 10 is an interconnect transportation mechanism for computer systems. A more detailed discussion of the PCI bus is set forth in the document "Peripheral Component Interconnect (PCI) Local Bus Specification, Apr. 30, 1993 which is incorporated herein by reference. In addition, U.S. Pat. No. 5,392,407 (Multiport Processor with Peripheral Component Interconnect Port and RAMBUS Port) describes feature of the PCI bus and is also incorporated herein for purposes of describing background information relative to the bus. Even though FIG. 1 shows the PCI add-in board 12 as being a separate unit from the PCI computing system 13 in an actual embodiment, the PCI add-in board 12 is mounted in an expansion slot under the cover of the PCI computer system 13.

Still referring to FIG. 1, the invention to be described hereinafter relates to the PCI add-in board 12 and in particular, to the PCI bus interface chip 12A, which interfaces with the PCI bus 10. The PCI bus interface chip 12A is a universal chip which can be used by vendors to interconnect different types of PCI add-in board 12 to the PCI bus. The PCI add-in board 12 includes a processor 12B with a local bus 12C. The local bus 12C interconnects the PCI bus interface chip 12A, non-volatile storage 12D, RAM 12E and task generator means 12F. The task generator means 12F is the subsystem of the PCI add-in board which performs required function to effectuate a desired task. By way of example, the task generator means 12F could be a communication adapter for attaching the PCI computer system 13 to a local area network (LAN) such as token ring, ethernet, FDDI and similar types of LANs. An example of a task generator for the token ring network is the IBM Auto LANStreamer PCI Adapter, P/N 04H8095.

Similarly, a task generator for ethernet is the IBM EtherStreamer MC 32 Adapter, P/N 74G0850.

As a general statement, task generators which could be coupled to the PCI bus interface chip include communication controllers (ethernet, token ring, FDDI, ATM, etc.), display controllers (VGA, XGA, etc.), multi-media devices (video, audio, CD-ROM, etc.), disk subsystems (IDE, SCSI, RAID, etc.) and co-processor subsystems (Pentium, Power PC, etc.).

It should be noted that these applications can all be practiced by the PCI add-in boards. According to the teachings of the present invention, the PCI bus interface chip 12A (details to be given later) can be used with any of the add-in boards and performs the bus interface function required for the add-in board to operate on the PCI bus.

Figure 2:
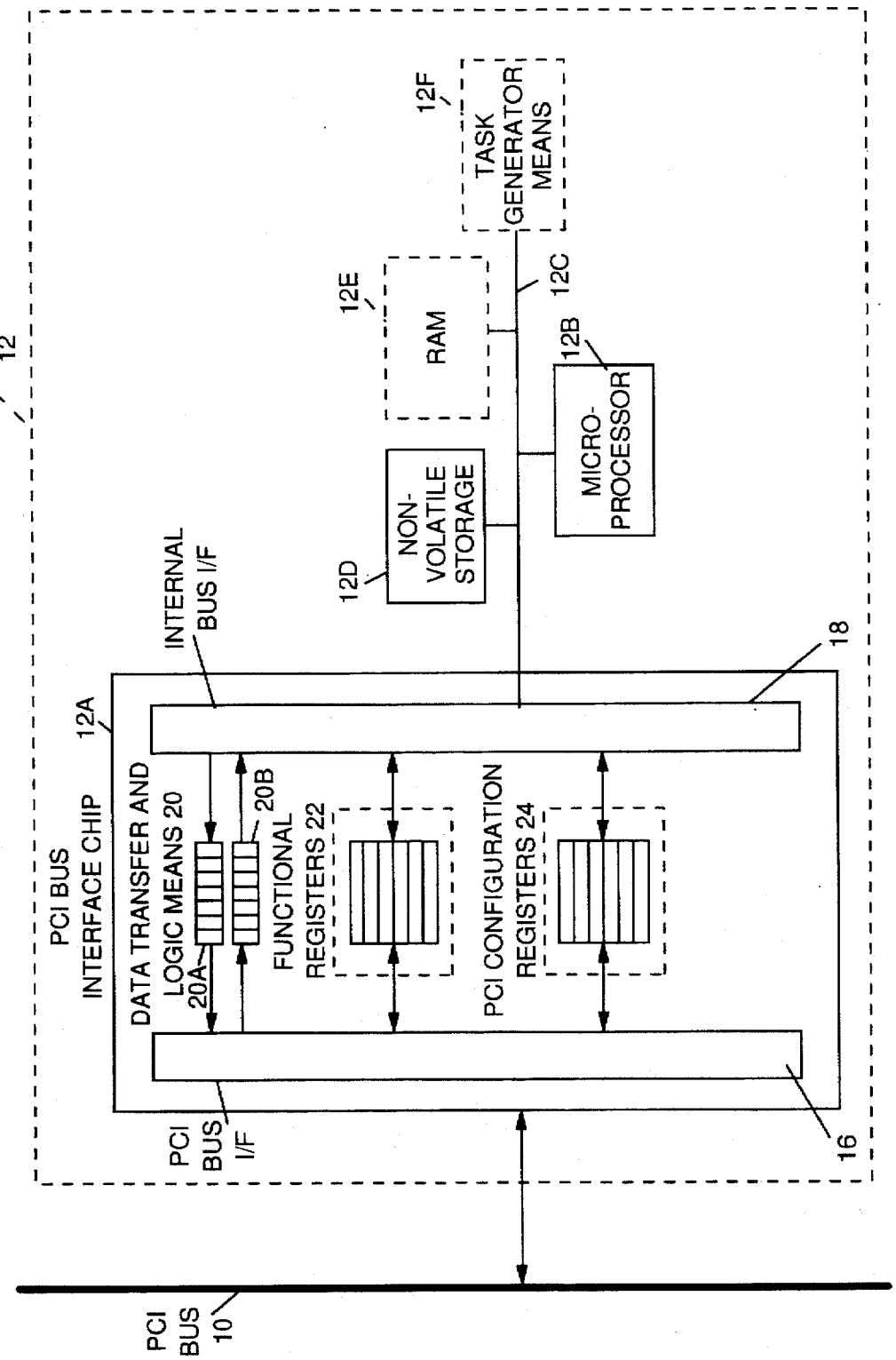
FIG. 2 shows a board level view block diagram of the add-in board according to the teachings of the present invention.

FIG. 2 shows a board level view of the PCI bus interface chip 12A. The PCI bus chip 12A includes a PCI bus interface 16 for connecting to the PCI bus 10. An internal bus interface means 18 couples the PCI bus interface chip 12A to internal bus 12C. Connected between the PCI bus interface means 16 and the internal bus interface means 18 are data transfer and logic means 20, functional registers 22 and PCI configuration register 24. The data transfer and logic means 20 is the main data transfer path between the PCI bus 10 and the PCI add-in board 12. The data transfer and logic means 20 include FIFO buffer 20A which moves data from the internal bus interface means 18 to the PCI bus interface means 16. Likewise, FIFO buffer 20B moves data in the opposite direction. The PCI configuration registers 24 can be written into and read by the PCI system processor executing the PCI system configuration software 14A (FIG. 1) over PCI bus 10. Information written into these registers configure the device resources such as I/O address, memory address, interrupt level, cache line, size, etc., of the device which the PCI add-in board couples to the PCI computer system.

Still referring to FIG. 2, the PCI configuration registers 24 include information that is critical for the configuration software 14A (FIG. 1) to be used to identify the device and understand how to properly configure it. The PCI standards requires the following list of read-only configuration registers. This list is by no means exhaustive and the invention is intended to cover the named and any other types of registers needed in interfacing a PCI add-in board to the PCI bus. Among the PCI architectured read-only registers are:

Vendor ID—a 16 bit register which identifies the vendor who manufacturers the device.

Device ID—a 16 bit register which is used by vendors to uniquely identify each of the types of PCI devices it offers.

Revision ID—an 8 bit register which can be used by vendors to identify the revision level of the device.

Class Code—a 24 bit register which identifies the generic function of the device (display controller, network controller, bridge device, etc.).

Base Address Registers—which contain read-only bits that indicate the devices I/O and memory mapping requirements.

Interrupt Line Register—an 8 bit register used to communicate interrupt line routing requirements.

Minimum Grant and Maximum Latency Timer Registers—8 bit registers which specify the devices desired settings for Latency Timer values.

As will be described below, the present invention covers the dynamic setting of values in the PCI configuration registers by the microprocessor 12B and the non-volatile storage 12D. As a consequence, the same PCI bus interface chip 12A can be used with several different types of PCI add-in boards.

The "functional registers" 22 are those registers that are separate from the PCI configuration registers. They are accessed only by application specific software such as a token-ring device driver. They provide interrupt/status functions, DMA control functions, and configuration capabilities for options that are not specified as part of the PCI bus specification.

Figure 3:
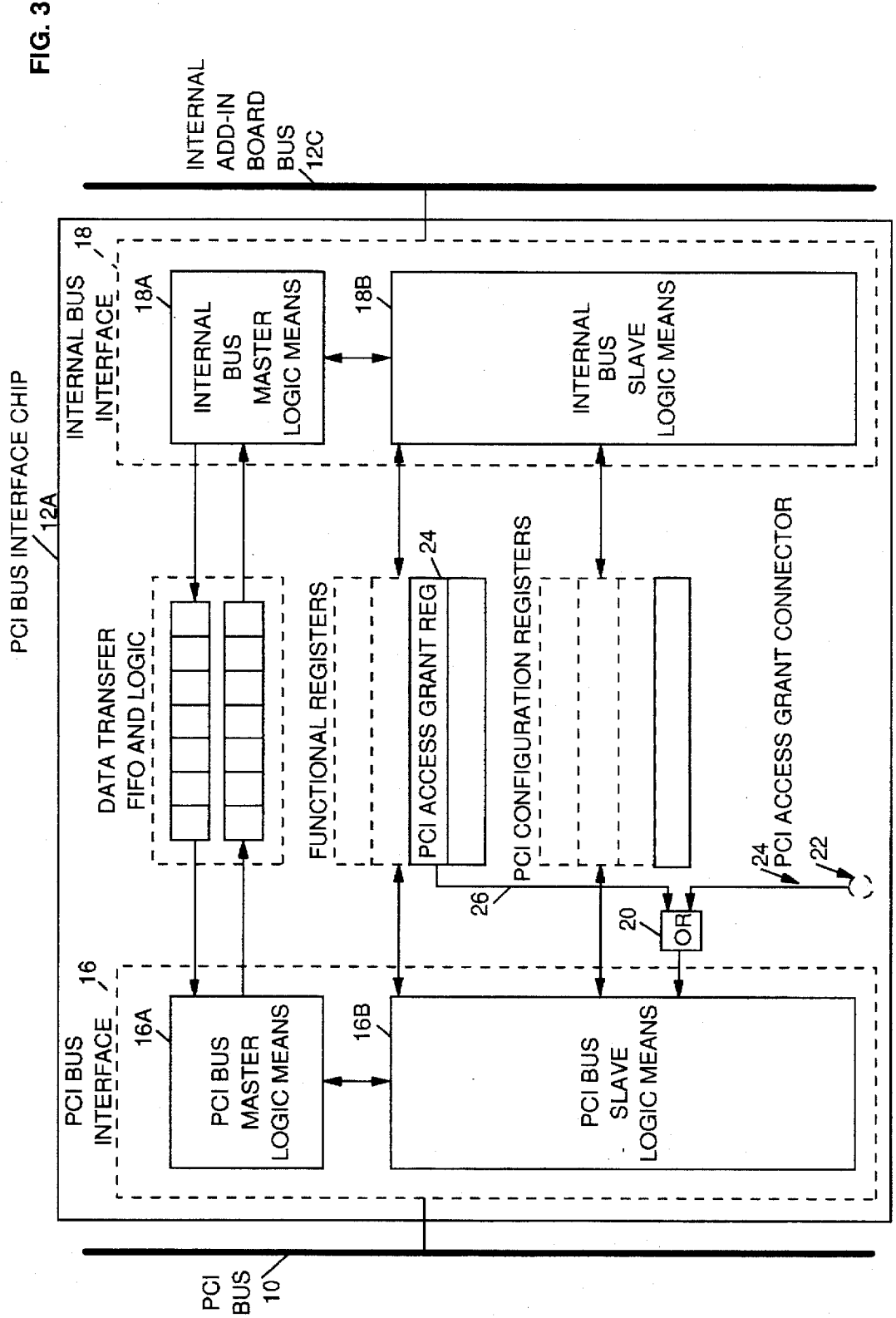
FIG. 3 shows a chip level view block diagram of the PCI interface chip according to the teachings of the present invention.

FIG. 3 shows a detailed block diagram of the PCI bus interface chip 12A interconnected to the PCI bus 10 and the internal add-in board bus 12C. In this figure, the PCI configuration registers which are programmable registers and written by the microprocessor 12B (FIG. 2) over the internal add-in board bus 12C are shown. In addition, the PCI access grant register which controls access to the PCI configuration register by the PCI processor is also shown. As will be explained subsequently in the preferred embodiment of this invention, PCI access grant register is a one-bit register. Of course, other types of configuration registers can be used for providing the same function without departing from the scope or spirit of the present invention.

Still referring to FIG. 3, the PCI bus interface means 16 includes a PCI bus master logic means 16A and a PCI bus slave logic means 16B. The PCI bus master logic means 16A performs burst data transfers between the PCI bus 10 and FIFOs within the PCI bus interface chip. It initiates transfers on the PCI bus by requesting ownership of the bus from PCI system bus arbitration logic (not shown) which exists as part of all PCI bus systems. The PCI bus slave logic means 16B responds as a target of PCI bus cycles initiated by other bus master such as the PCI system processor. It provides the necessary handshaking of control signals on the PCI bus to allow the PCI system processor to read and write registers on the PCI bus interface chip.

Similar to the PCI bus interface 16, the internal bus means 18 includes an internal bus master logic means 18A and an internal slave logic means 18B. The internal bus master logic means 18A performs burst data transfers between the internal add-in bus 12C and FIFOs within the PCI bus interface chip. The internal bus slave logic means 18B services register read and write operations from the add-in board microprocessor.

Still referring to FIG. 3, the OR logic circuit 20 has an output connected to PCI bus slave logic means 16B and two inputs, one of which is connected over conductor 26 to the PCI access grant register 24 and the other input connected over conductor 24 to PCI Access Grant Connector pin 22. The pin 22 is attached to the PCI bus interface module 12A and is shown schematically as a circle in FIG. 3. As will be explained subsequently, when the output signal from the OR logic circuit 20 is active, the PCI processor can access the PCI configuration registers over the PCI bus. If the output from the OR circuit 20 is inactive, access to the configuration registers are blocked to the PCI processor. The state of the signal from the OR circuit 20 is controlled by a bit in the PCI access grant register which is set by the processor 12B (FIG. 2) or the pin 22 on the PCI bus interface chip 12A.

Figure 4:
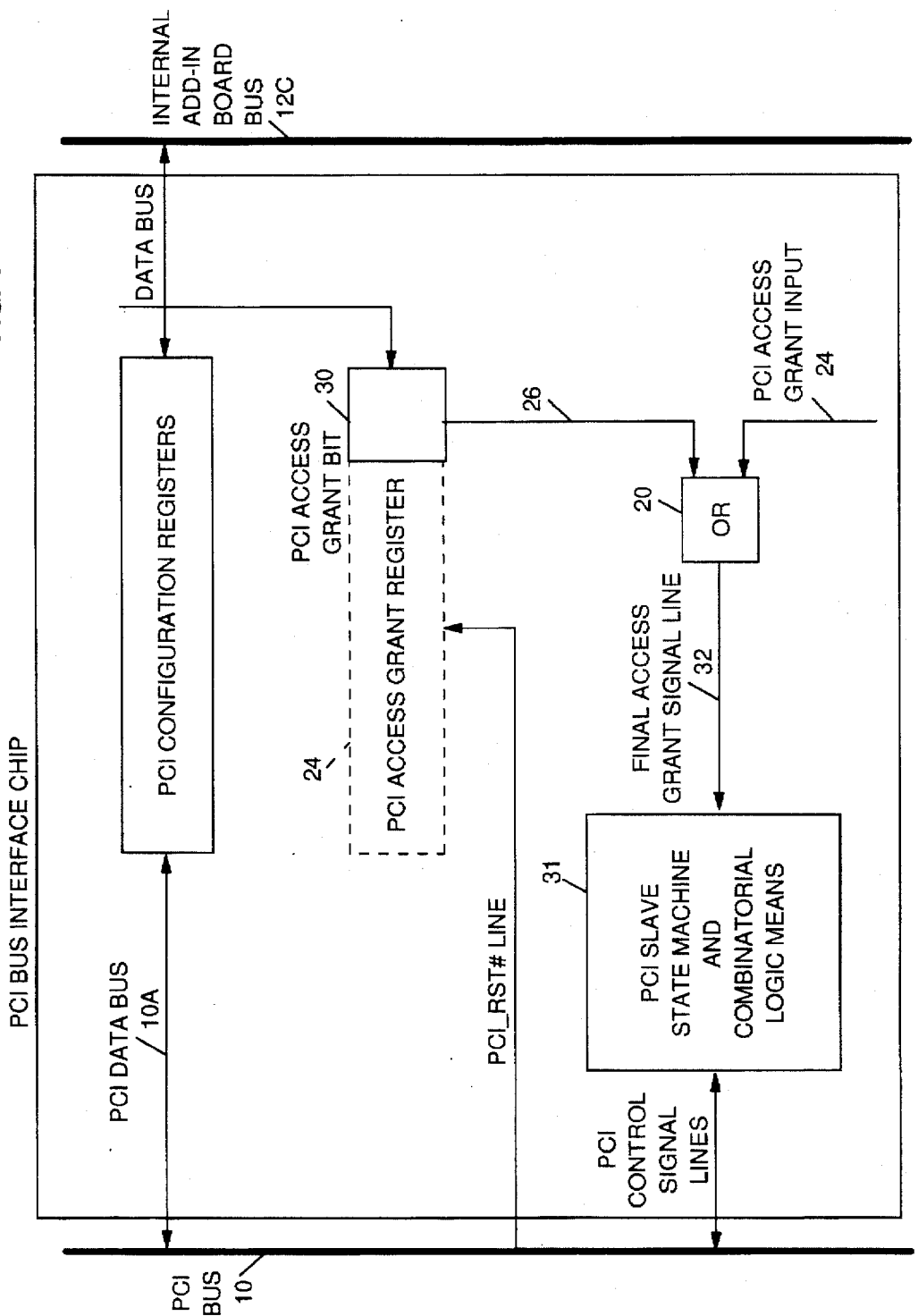
FIG. 4 shows a circuit block diagram of the PCI bus interface chip according to the teachings of the present invention.

FIG. 4 illustrates the logic which allows the microprocessor 12B (FIG. 1) to write data in the PCI configuration register while the PCI system processor 14 (FIG. 1) is inhibited from accessing the PCI configuration registers. However, once the writing is completed, and the PCI access grant bit 30 is set in the PCI access grant register 24, the previously inhibited PCI processor is given permission to access all registers on the PCI bus interface chip.

Still referring to FIG. 4, a set of the data lines (on the PCI bus) called the PCI data bus 10A interconnects the PCI configuration registers to PCI bus 10. A control architectured line called the PCI-RST # LINE interconnects the PCI access grant register 24 to the PCI bus 10. Finally, a set of PCI control signal lines necessary to activate the so-called retry function of the PCI bus, interconnects the PCI Bus 10 to the PCI Slave State Machine and Combinatorial logic means 31.

The input to the PCI slave state machine and combinatorial logic means 31 is connected by final access grant signal line 32 to OR circuit 20. The signals on conductors 24 and 26 have already been described relative to FIG. 3 and will not be repeated here.

Figure 5:
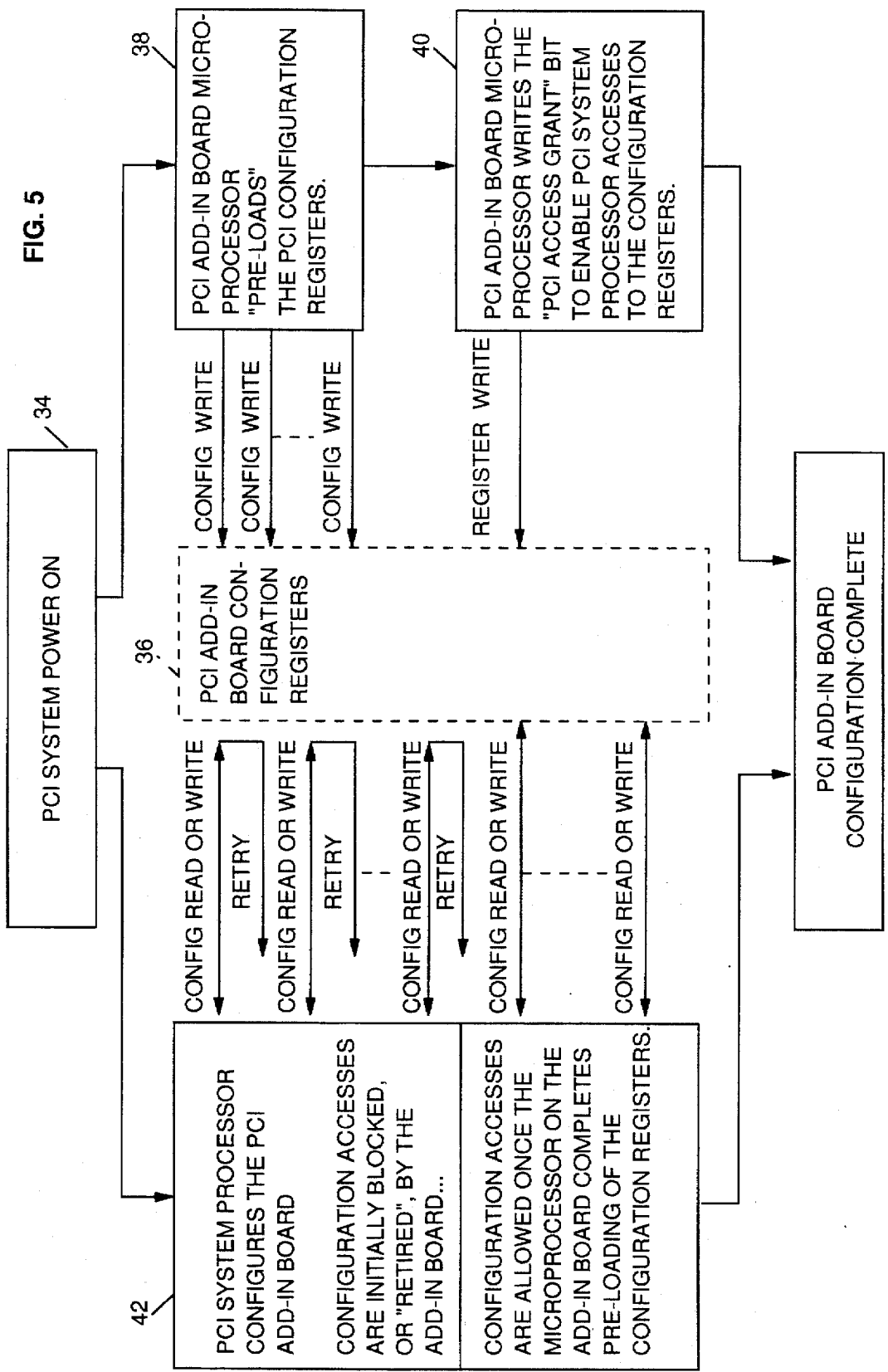
FIG. 5 shows a flow chart of process steps taken by the PCI processor and the add-in board processor, respectively, in order to configure and set the configuration registers.

FIG. 5 shows a flow chart of the interaction between the PCI system processor trying to access the PCI add-in board configuration registers and the PCI add-in board microprocessor preloading the PCI configuration register. In summary, at power-on, the PCI system configuration software running in the PCI processor 42 tries to enter the PCI add-in board configuration registers (located in the PCI interface chip). The PCI system processor accesses are denied until the add-in board microprocessor writes the PCI access grant bit in the PCI bus interface chip. The denial allows the PCI add-in board microprocessor to complete the configuration registers preload operation before the PCI system configuration software can access the configuration registers.

More particularly, the process begins when the PCI system is powered on (block 34). The PCI add-in board with its configuration register is shown schematically by 36. Following power-on, the PCI system processor 42 attempts to access the configuration registers via the lines labeled "Config Read or Write". These attempts are disallowed and the disallowances are shown schematically by the lines labeled Retry. During this time interval, the PCI add-in board microprocessor 38 obtains information from the non-volatile ROM on the board and writes the appropriate configuration registers with the previously stored information retrieved from the non-volatile storage (block 38). Once this is completed, PCI add-in board microprocessor in block 40 writes the PCI access grant bit which enables the PCI system processor 42 to exit from the retry mode and access the registers on the add-in board. Access to the register is indicated by the double-headed arrow labeled "Config. Read or Write" in FIG. 5. Once the function of either reading or writing the register is completed, the PCI add-in board configuration is completed and the system is now in a condition to communicate with the device which the add-in board couples to the PCI bus.

Figure 6:
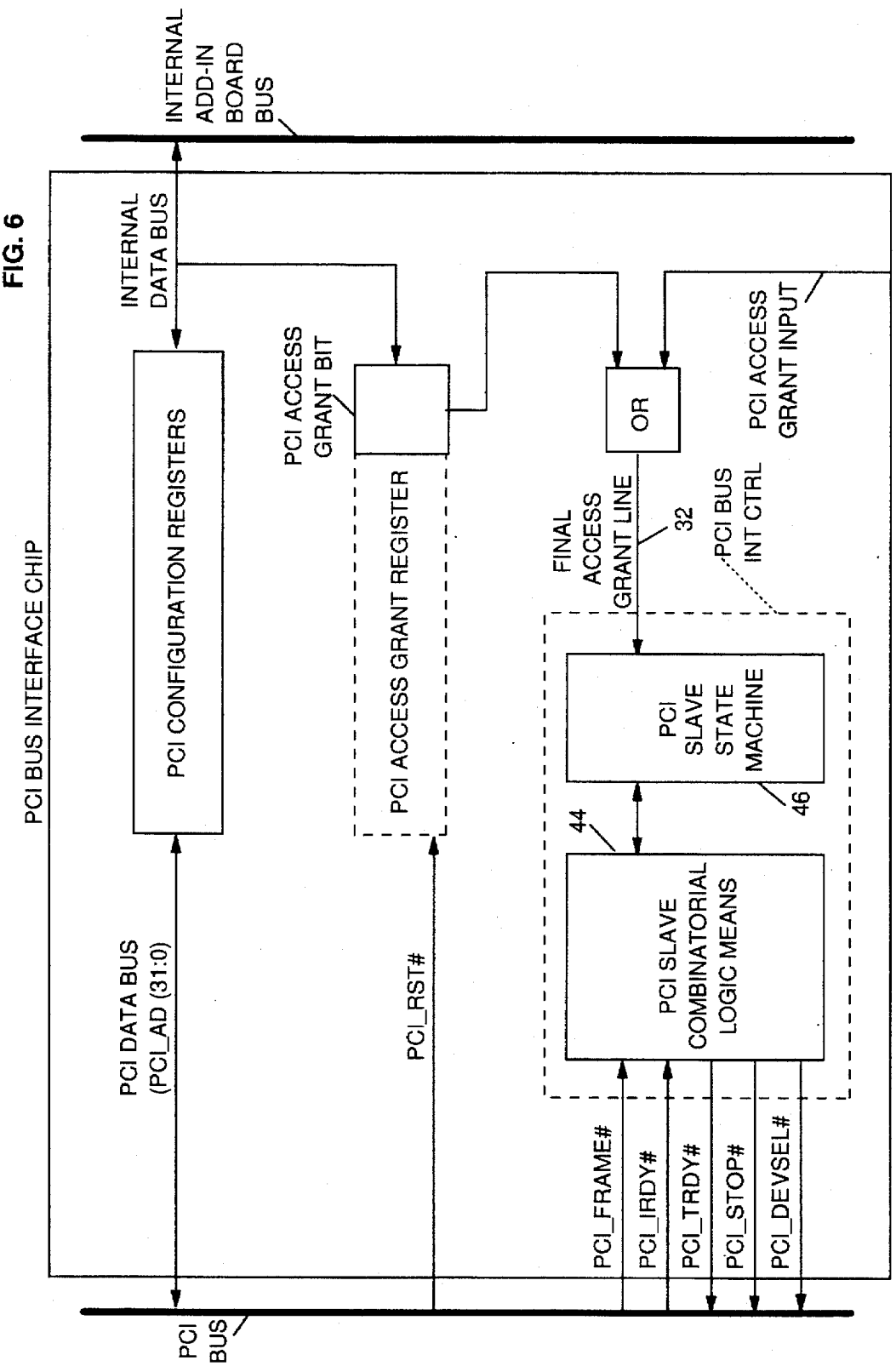
FIG. 6 shows a block diagram of the PCI bus interface chip controller.

FIG. 6 shows a block diagram of the PCI bus interface controller. The functions, in part, of the PCI bus interface controller are to generate the control signals which force the PCI processor into the "Retry" state and inhibit said PCI processor from accessing the registers on the PCI bus interface chip. Components, in FIG. 6, which are similar to previously described components will not be identified or discussed. The PCI bus interface controller is comprised of PCI slave combinatorial logic means 44 and PCI slave state machine 46. The PCI slave combinatorial logic means 44 decodes control signals on the PCI bus (PCI FRAME # and PCI IRDY #) and signals the PCI slave state machine 46 that a register read or write operation has been initiated by the PCI system processor to the PCI bus interface chip. The PCI slave state machine 46 then sequences through the states required to service the read or write operation. The PCI slave combinatorial logic means 44 decodes outputs of the PCI slave state machine 46 and responds by activating control signals on the PCI bus (PCI DEVSEL #, PCI TRDY #, and PCI STOP #) to signal the PCI system processor that the bus cycle has been completed.

If the final access grant signal on final access grant line 32 is in an inactive low state, the PCI slave state machine 46 will respond by signalling a "retry" condition in response to the read or write operation from the PCI system processor. Using outputs of the PCI slave state machine 46, the PCI slave combinatorial logic means 44 signals a retry condition by activating the PCI DEVSEL # and PCI STOP # signals and deactivating the PCI TRDY # signal. The PCI system processor uses this signal sequence as an indication that access to the registers has been denied and the bus transaction must be "retried" again at a later time. If the final access grant signal 32 is in the active high state, the PCI slave state machine 46 and combinatorial logic means 44 respond with a normal bus transaction by activating the PCI DEVSEL # and PCI TRDY # signals. The PCI system processor uses this signal sequence as an indication that the read or write access to the register has been completed normally. The precise signal sequences required for "retry" and normal read and write bus transactions are defined within the PCI Local Bus Specification, Production Version, Revision 2.0 which is incorporated herein by reference.

Figure 7:
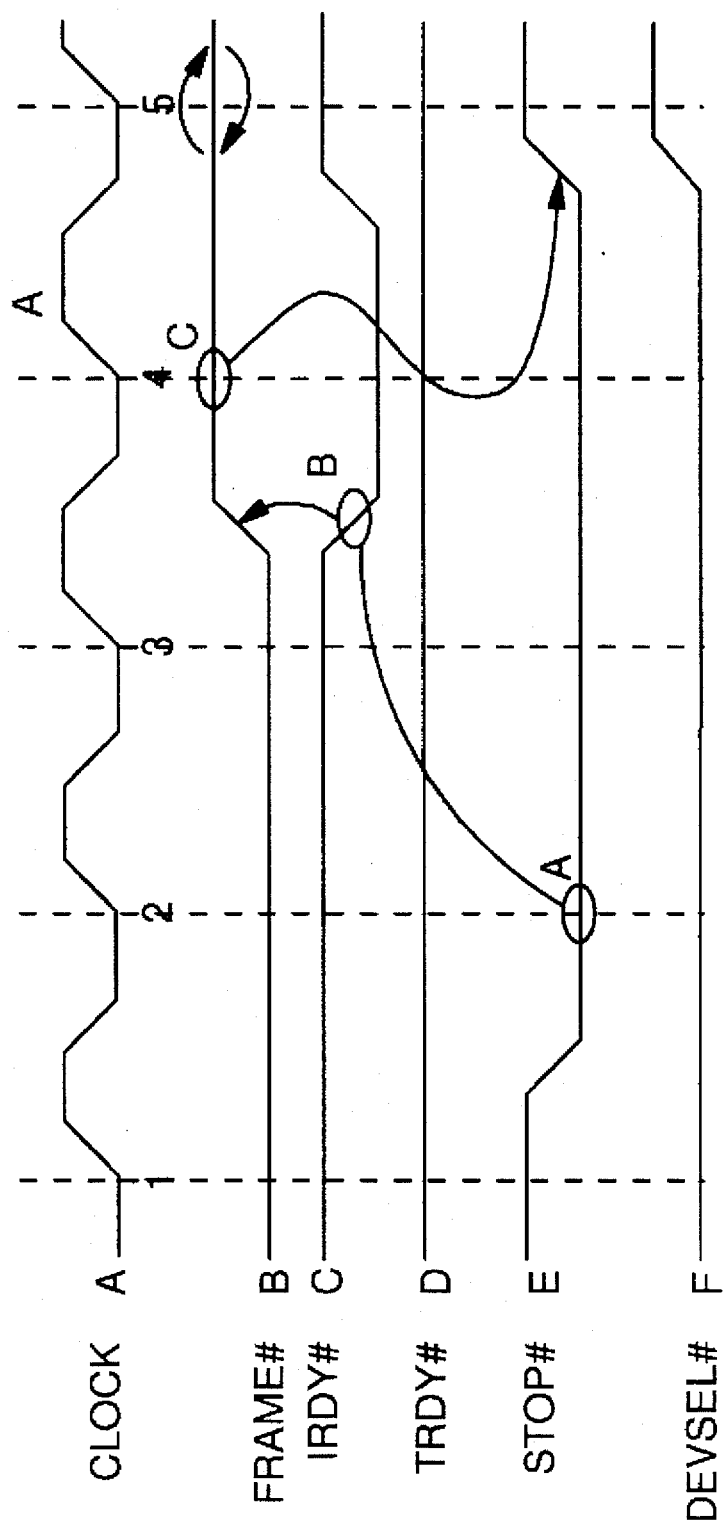
FIG. 7 shows a timing diagram for the retry cycle.

FIG. 7 shows a timing or event diagram for the hand shaking procedure which is practiced between the PCI processor and the PCI bus interface chip (FIG. 6). The hand shaking routine is required to force the PCI processor into a retry mode. The retry mode is invoked when a slave device such as the PCI bus interface controller is not ready to communicate with a master device such as the PCI processor. The signals required for this routine are architected in the above-referenced PCI specification. The signals include a clock, Frame #, IRDY #, TRDY #, STOP # and DEVSEL #. The signals labeled Frame # and IRDY # are outputted on the PCI bus by the PCI processor when it desires to access the configuration register in the PCI bus interface chip. The signals labeled TRDY #, STOP # and DEVSEL # are signals generated by the PCI bus interface controller in response to the signals outputted from the PCI processor. The named signals and the direction of flow are shown in FIG. 6. The numeral 1, 2, 3, 4 and 5 indicate the period when the PCI bus interface chip samples the signal outputted from the PCI processor. Likewise, the circles labeled A, B and C indicate instances when one device initiates certain action and the reaction from the other device. For example, A is initiated by the PCI bus interface chip and B is the response from the PCI processor. When applied to the respective signals, if the signal labeled STOP # is low, the IRDY # signal is dropped and the FRAME # signal is raised. The other events showed by C operate in a similar manner. Finally, the retry cycle is completed at interval 5 and is shown by the two arrows with the arrow heads pointing in opposite directions.

Operation

The operation of the invention will now be described. The invention provides programmable configuration registers for use in the add-in board of a PCI computer system. In summary, the microprocessor 12B (FIG. 1) on a PCI add-in board is made to pre-load unique values into the add-in board read-only PCI configuration register before said registers are accessed by the PCI system configuration software. As a consequence, a common PCI bus interface chip can be used across add-in boards that are produced by multiple vendors and implement different types of functions.

In particular, the microprocessor and non-volatile storage are usually part of the inherent components on the add-in board. The microprocessor and non-volatile storage are located on the internal add-in board bus 12C. This bus is isolated from the PCI bus by the PCI bus interface chip. When the PCI system is powered on, a signal on the PCI-RST # Line (FIG. 4) sets the PCI access grant bit 30 to zero. Simultaneously, the PCI slave state machine and combinatorial logic 31 which is the controller on the PCI bus interface chip activates selected ones of the PCI Control Signal Lines which causes the PCI processor to enter the so-called "Retry Mode" and cannot access the registers on the PCI bus interface chip.

In the meantime, when the PCI processor is denied access to the registers on the PCI interface chip, the microprocessor 12B executes code, following power-on-set of the PCI system, which reads the assigned read-only PCI configuration register values from programmed location in the non-volatile storage 12D (FIG. 1). For example, the non-volatile storage could be flash, RAM, ROM, etc. The microprocessor then writes the unique values to the PCI configuration register within the PCI bus interface chip. To release the retry condition which causes the PCI processor not to access the configuration or any other registers in the PCI bus interface chip, the microprocessor writes the PCI access grant bit 30 (FIG. 4). Writing this bit causes the final access signal on Final Access Grant Line 32 to become active and the PCI slave state machine and combinatorial logic means 31 deactivates the previously activated PCI control signal lines. This, in turn, allows the PCI processor to access the configuration registers. All access to these registers are controlled by the PCI system configuration software 14A running on the PCI system processor 14 (FIG. 1).

It may be desirable to also use the PCI bus interface chip in applications where no microprocessor or no non-volatile storage exists on the add-in board. It may also be desirable to use the chip in a dedicated application where the precise values contained in the read-only configuration registers are not critical. In either case, the invention permits the function of the PCI access grant bit to be overridden by input pin 22 (FIG. 3) on the PCI bus interface chip. If the PCI access override pin is terminated to its inactive high state, the PCI access override input pin will permit retries of PCI configuration access to be controlled by the PCI access grant bit as described above. If terminated to its active low state, the PCI access override input pin will override the function of the PCI access grant bit and permit all configuration access from the PCI bus to be serviced normally without retry. In this case, the power-on default values of the read-only PCI configuration registers are used and the ability to load unique values is not supported.

Although a preferred embodiment of the present invention has been described and disclosed in detail, other modifications and embodiments thereof which would be apparent to one having ordinary skills are intended to be covered by the spirit and scope of the appended claims.

I claim:

1. An add-in board for using in a PCI computer system comprising: a first bus;
   a sub-assembly means coupled to the first bus;
   said sub-assembly means performing predetermined functions to accomplish a desired task;
   a microprocessor coupled to the first bus;
   a non-volatile storage means coupled to the first bus, said non-volatile storage means storing configuration information;
   a Peripheral Component Interconnect (PCI) bus interface chip interconnected to the first bus and a second bus, said PCI bus interface chip including programmable configuration registers accessible by a PCI microprocessor, over the second bus, and the microprocessor; and
   a PCI bus interface chip controller responsive to a first signal to inhibit the PCI microprocessor from accessing said configuration registers until the microprocessor pre-loads the configuration information into the said configuration registers.

2. The add-in board of claim 1 wherein the first signal includes a power-on signal.

3. The add-in board of claim 1 or 2 wherein the sub-assembly means performs predetermined functions to accomplish the desired task of a communication controller which attaches said PCI system to a Local Area Network; (LAN).

4. The add-in board of claim 3 wherein the LAN includes ethernet, token ring, Fiber Data Distribution Interface (FDDI) or Asynchronous Transfer Mode (ATM).

5. The add-in board of claim 1 or 2 wherein the sub-assembly means performs the predetermined functions to accomplish the desired task of a device controller.

6. The add-in board of claim 5 wherein the device controller controls display, multimedia, disk subassembly including recording medium, recording head and controller or co-processor subsystems including Central Processor Unit, ROM, RAM and stored programs.

7. The add-in board of claims 1 or 2 wherein the PCI bus interface chip controller further includes PCI slave combinatorial logic means being responsive to a set of enabling signals to activate selected control lines in the PCI bus of the PCI system; and
   a PCI slave state machine being responsive to a final access grant control signal to generate the set of enabling signals.

8. The add-in board of claim 7 wherein the final access grant signal is being generated from the output of an "OR" logic circuit means and a single bit register, with an output from the single bit register connected to a first input of the "OR" logic circuit means and a second input of the OR logic circuit means being connected to an input pin of said PCI bus interface chip.

9. In a PCI computer system having a PCI bus to which a PCI processor executing a PCI configuration software is connected and a PCI add-in board is connected to said PCI bus, a method for configuring the PCI add-in board comprising the steps of:
   providing a set of configuration registers and a control register on the PCI add-in board, with the set of configuration registers being accessible by the PCI processor and a local processor located on the add-in board;
   on receiving a predetermined signal, a controller on the add-in board activates a predetermined set of control signals on the PCI bus which causes the PCI processor to delay accessing the set of configuration registers;
   using the local processor to download configuration data stored in said processor into the set of configuration registers;
   upon completing loading of the set of configuration registers, notifying the controller which deactivates the set of control signals which was previously activated, thereby allowing the PCI processor to access the set of configuration registers and configuring said PCI add-in board.

10. An interface subsystem for coupling add-in boards to the PCI bus of a PCI computer system comprising:
    at least one configuration register for storing configuration data;
    a control register for storing control information;
    a PCI bus interface controller being responsive to a first signal to activate selected signals, on the PCI bus, into a first state which inhibits a PCI processor from accessing said at least one configuration register; and
    a circuit arrangement for monitoring the control register and depending on the state of one or more selected bits in said register outputs a second signal which causes the PCI bus interface controller to deactivate the selected signals, on the PCI bus, into a second state to enable the PCI processor to access the at least one configuration register.

11. The interface subsystem of claim 10 further including functional registers which can be written and read by the PCI processor over the PCI bus.

12. The interface subsystem of claim 10 wherein the first signal is a power-on signal.

13. The interface subsystem of claim 10 wherein the PCI bus interface means includes a combinatorial logic circuit arrangement with outputs coupled to the PCI bus and
    a controller coupled to inputs of said combinatorial logic circuit arrangement.

14. The interface subsystem of claim 13 wherein the controller includes a state machine.

15. The interface subsystem of claim 10 wherein the circuit means includes a logic "OR" circuit having an output coupled to the PCI bus interface means and two inputs one of which is coupled to the register means; and
    a conductor for providing a control signal from an external source connected to another one of the two inputs.

16. The interface subsystem of claim 10 wherein the external source includes a pin mounted on said interface subsystem.

17. An add-in board for use in a computer system comprising:
- a bus;
- a task generator coupled to the bus, said task generator including circuitry which performs required functions to accomplish a desired task;
- a storage including configuration information coupled to the bus;
- a Peripheral Component Interconnect (PCI) bus interface chip including programmable Configuration Registers;
- a controller including logic circuit and a register for controlling access to the Configuration Registers; and
- a microprocessor coupled to the bus, said microprocessor responsive to a signal to load configuration information into the Configuration Registers and activate the controller wherein a processor associated with said computer system is given access to said Configuration Registers to configure the Add-in Board.

18. The Add-in Board of claim 17 wherein the task generator includes an adapter for attaching to a LAN.

19. The Add-in Board of claim 17 wherein the task generator includes a device controller.

20. In a computer system comprising a processor and an adapter card coupled to the bus of the processor, a method for configuring the adapter card comprising the steps of:

(a) providing programmable configuration registers, on the adapter card;

(b) providing circuitry, on the adapter card, which outputs electrical signals that cause the processor to access or not access the configuration registers;

(c) activating the circuitry to generate the electrical signals denying the processor access to said configuration registers;

(d) using a processor on the adapter card to load configuration information into said configuration registers; and (e) activating the circuitry to generate electrical signals allowing said processor to access said configuration registers to configure said adapter card.

21. The interface subsystem of claim 10 wherein the at least one configuration register is programmable.

* * * * *